United States Patent [19]

Koizumi et al.

[11] 4,404,610

[45] Sep. 13, 1983

[54] MODE SELECTION ASSEMBLY FOR USE IN TAPE RECORDERS OR THE LIKE

[75] Inventors: Satoru Koizumi; Hiroaki Nakao; Takashi Tsuchitani, all of Higashihiroshima, Japan

[73] Assignee: Sharp Kabushiki Kaisha, Osaka, Japan

[21] Appl. No.: 254,175

[22] Filed: Apr. 14, 1981

[30] Foreign Application Priority Data

Apr. 15, 1980 [JP] Japan ................... 55-51071
Apr. 15, 1980 [JP] Japan ................... 55-51072
Apr. 15, 1980 [JP] Japan ................... 55-51073

[51] Int. Cl.³ .................. G11B 15/24; G11B 15/44
[52] U.S. Cl. ....................... 360/137; 360/90; 360/105
[58] Field of Search ............ 360/137, 90, 93, 105; 242/197-200

[56] References Cited

U.S. PATENT DOCUMENTS

| | | | |
|---|---|---|---|
| 4,018,404 | 4/1977 | Sami | 360/137 |
| 4,170,789 | 10/1979 | Inoue | 360/137 |
| 4,172,266 | 10/1979 | Onishi | 360/137 |
| 4,176,383 | 11/1979 | Suzuki | 360/137 |
| 4,194,229 | 3/1980 | Yamamoto et al. | 360/137 |
| 4,219,852 | 8/1980 | Magata et al. | 360/90 |

Primary Examiner—Alfred H. Eddleman
Attorney, Agent, or Firm—Birch, Stewart, Kolasch & Birch

[57] ABSTRACT

A mode selection assembly for use in tape recorders or the like is disclosed which includes a rotating member (for example, a gear) rotatable in an intermittent manner and bearing a plurality of projections, a plurality of actuator levers for selection of the operating modes of the tape recorder or the like, a plurality of engaging members one of which engages with one of the projections in response to actuation of the actuator levers. The rotating member is prevented from rotating to bring the tape recorder or the like into a desired one of the operating modes when one of the projections is held in engaging relationship with one of the engaging members and the rotating member is permitted to rotate for selection of another operating mode when none of the projections are in engaging relationship with the engaging members.

15 Claims, 5 Drawing Figures

FIG.1

MODE SELECTION ASSEMBLY FOR USE IN TAPE RECORDERS OR THE LIKE

BACKGROUND OF THE INVENTION

1. Field of the Art

This invention relates to a mode selection assembly for use in tape recorders or the like and more particularly to an assembly for selecting one of a plurality of operating modes through the utilization of rotating torque of a rotating member.

2. Prior Art

A prior art assembly of the above mentioned sort is disclosed in Japanese Unexamined Utility Model Publication 54/48610, by which respective mode selections are performed with a single rotating member (that is, a gear). In the case where such a prior art mode selection assembly is applied to a tape recorder, it demands a number of the rotating members and peripheral components and thus complexity of structure and increase in cost with an increase in the number of the operating modes.

OBJECTS AND SUMMARY OF THE INVENTION

Accordingly, it is an object of the present invention to provide a mode selection assembly in which a plurality of operating modes are selected through the use of a single rotating member.

In accordance with a preferred form of the present invention, there is provided a mode selection assembly for tape recorders or the like comprising a rotating member rotatable in an intermittent manner and bearing a plurality of projections, a plurality of actuator means for selection of the operating modes of said tape recorder or the like, and a plurality of engaging means one of which engages with one of said projections in response to actuation of said actuator means. The rotating member is prevented from rotating to bring said tape recorder or the like into a desired one of the operating modes when one of said projections is held in engaging relationship with one of said engaging means and said rotating member is permitted to rotate for selection of another operating mode when none of said projections are in engaging relationship with said engaging means.

BRIEF DESCRIPTION OF THE DRAWINGS

For a more complete understanding of the present invention and for further objects and advantages thereof, reference is now made to the following description taken in conjunction with the accompanying drawings showing a mode selection assembly for use in a tape recorder or the like in accordance with an embodiment of the present invention, in which.

DETAILED DESCRIPTION OF THE INVENTION

Figure 3:
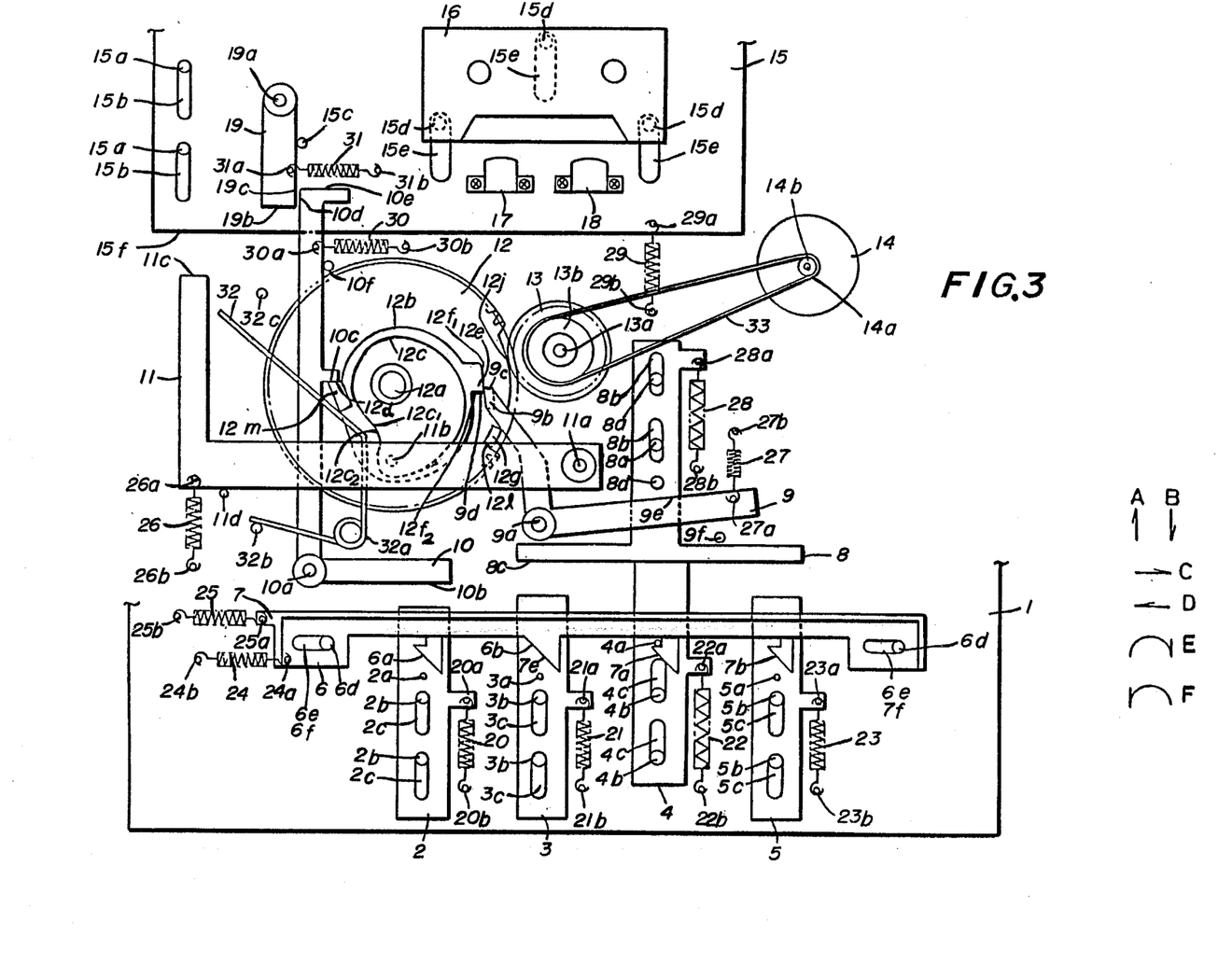
FIG. 3 is a plan view of the same in a fast forward mode.
Figure 4:
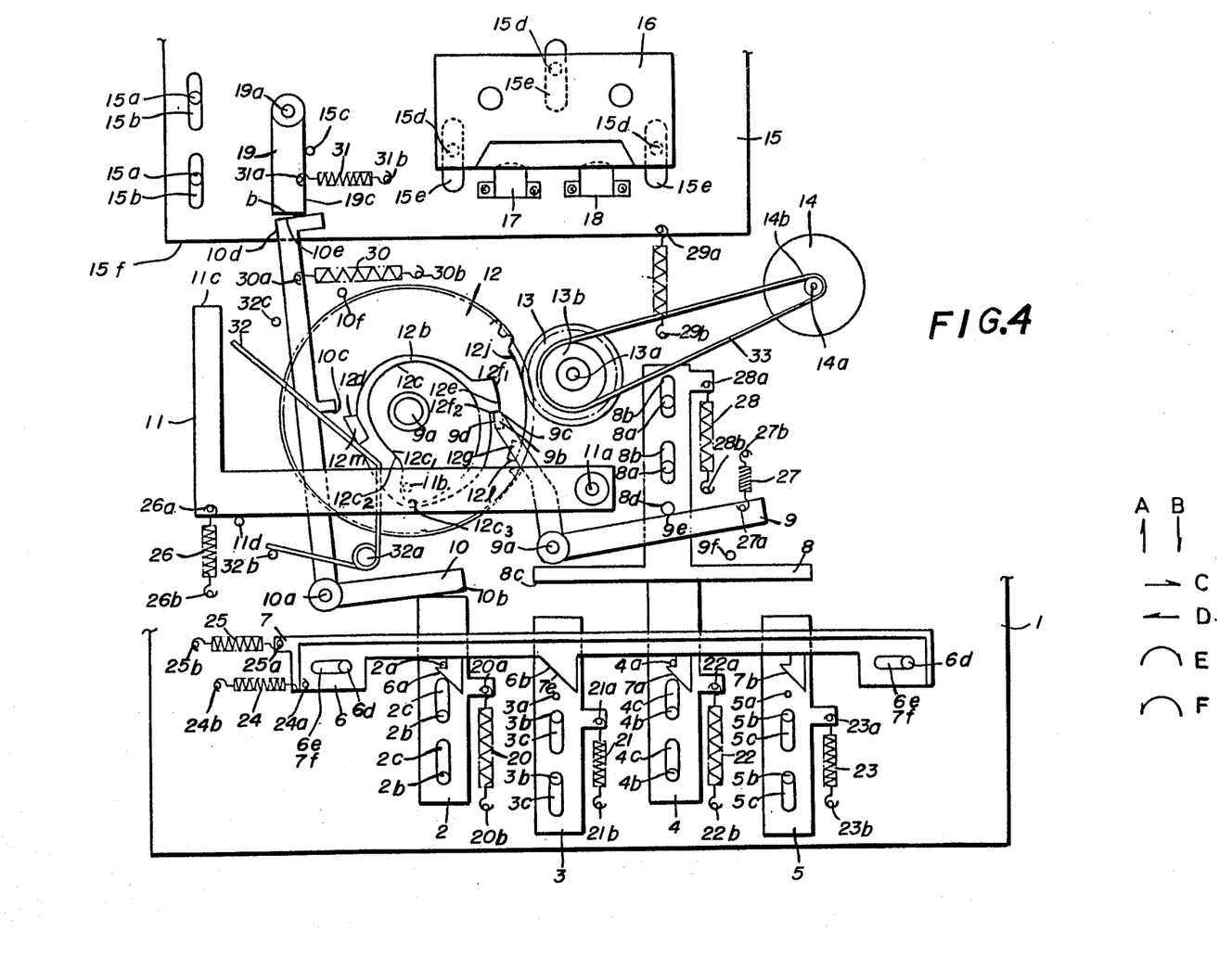
FIG. 4 is a plan view of the same in a fast forward/-program search mode.
Figure 5:
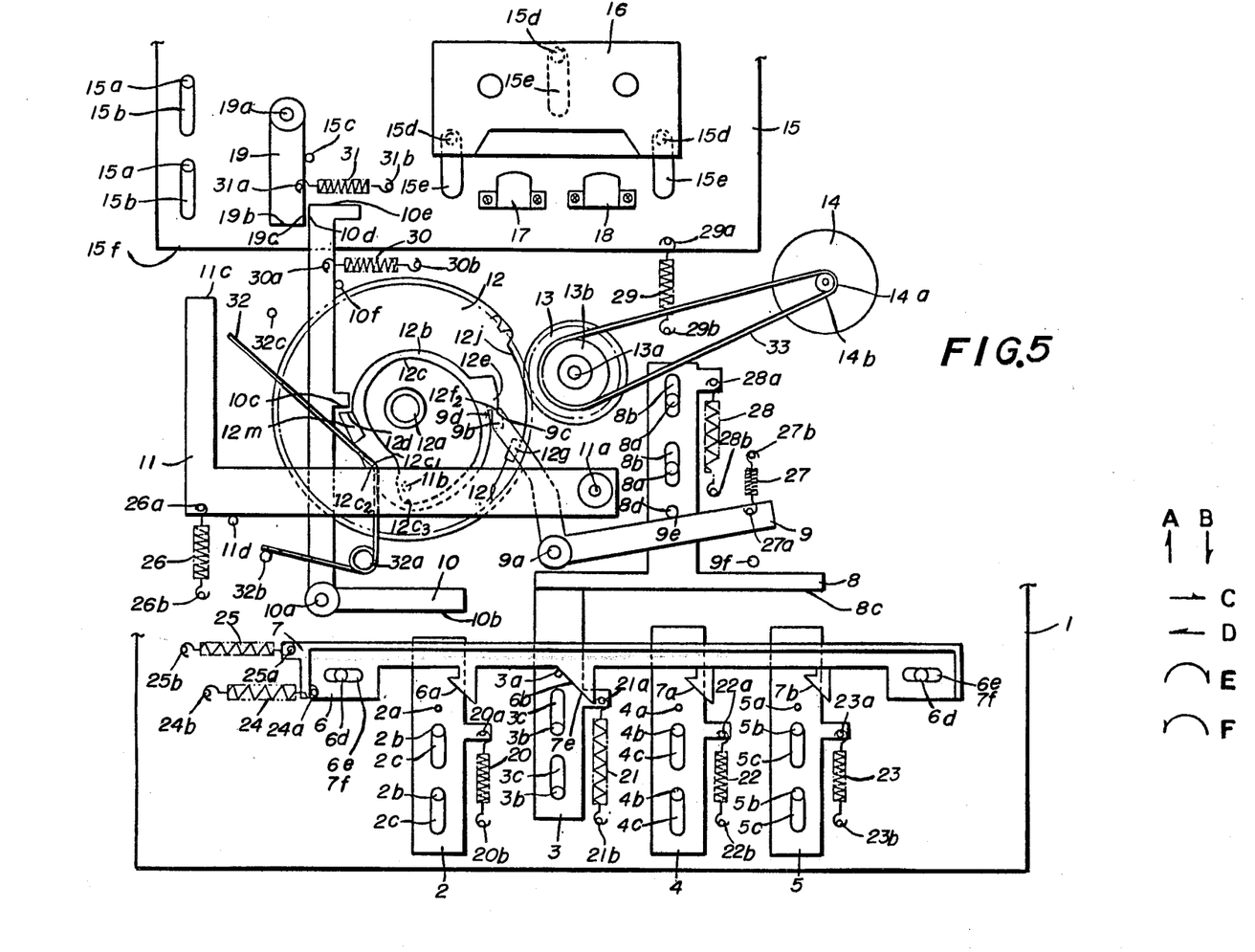
FIG. 5 is a plan view of the same when a stop lever is actuated under a play mode.

Referring to the drawings, there is illustrated a mode selection assembly embodying the present invention for use in a tape recorder or the like and more particularly FIGS. 1 to 4 illustrate the mode selection assembly in a stop mode, play mode, fast forward mode, and fast forward/program search mode, respectively, and FIG. 5 shows the same at the moment where a stop lever is actuated under a play mode.

The illustrated assembly includes a main chassis 1 and a play lever 2, a stop lever 3, a fast forward lever 4 and a rewind lever 5 juxtaposed on the main chassis 1. The respective levers are slidable between a non-actuated position in a stop mode and an actuated position in one of the operating modes (e.g., play mode, fast forward mode, etc.) in the directions of the arrows A and B by inserting guide shafts 2b to 5b standing on the main chassis 1 into guide holes 2c to 5c. Furthermore, the respective levers are constantly biased forward to non-actuated positions with springs 20 to 23 extending between pins 20b to 23b resting on the main chassis 1 and pins 20a to 23a thereon.

All of the actuator levers except for the stop lever 3 have lock pins 2a, 4a and 5a and the stop lever 3 has a release pin 3a.

First and second lock plates 6 and 7 are stacked one on top of the other and held suitable in a direction normal to the sliding directions of the respective actuator levers (that is, the directions of the arrows C and D) by inserting a guide shaft 6d on the main chassis 1 into guide holes 6e and 7f. The first and second lock plates 6 and 7 are constantly biased in the direction of the arrow D under the influence of a pair of springs 24 and 25 extending between pins 24b and 25b on the main chassis 1 and corresponding pins 24a and 25a.

The first lock plate 6 is provided at its side edge facing against the play lever 2 with a lock section 6a for engaging with the lock pin 2a of the play lever 2 and holding the play lever 2 in its actuated position. The first lock plate 6 further includes an inclined surface 6b facing against the stop lever 3 in contact with the release pin 3a of the stop lever 3. Likewise, the second lock plate 7 has at its side edge facing against the fast forward and rewind levers 4 and 5 lock sections 7a and 7b which engage with the lock pins 4a and 5a on these levers and hold the same in its actuated position. It further has an inclined surface 7e facing against the stop lever 3 in contact with the release pin 3a.

Disposed behind the stop, fast forward and rewind levers 3 to 5 is an actuator rod 8 of a reversed "T" shaped configuration which is slidable by fitting a guide shaft 8a on the main chassis 1 into a guide hole 8b. A spring 28 extending between a pin 28a on the actuator rod 8 and the counterpart on the main chassis 1 constantly urges the actuator rod 8 in the direction of the arrow B. The actuator rod 8 has a horizontal contact section 8c which may move into contact with or be removed from the respective rear ends of the stop, fast forward and rewind levers 3 to 5. When any of these levers 3 to 5 is actuated and moved backwardly in the direction of the arrow A, the actuator rod 8 is also moved backwardly in the direction of the arrow A against the spring 28.

An "L" shaped arm 9 is pivoted about a support shaft 9a resting on the main chassis 1 and biased counterclockwise (the direction of the arrow F) under the influence of a spring 27 extending between a pin 27a projecting at the tip of its horizontal segment traversing the upper surface of the actuator rod 8 and an opposing pin 27b positioned on the main chassis 1. The arm 9 also has at the tip of its vertical segment a downwardly directed projection 9b with two bearing surfaces 9c and 9d.

The arm 9 is biased clockwise (the direction of the arrow E) by the spring 28 so as to offset the force of the spring 27 via a pin 8d on the actuator rod 8 in a stop mode and a play mode. However, if the actuator rod 8 is moved backwardly in the direction of the arrow A upon actuation of one of the levers 3 to 5 as mentioned previously, then the arm 9 is rotated in the direction of the arrow A by the spring 27. The span of the rotating movement of the arm in the direction of the arrow A under the influence of the spring 28 is limited by a pin 9f positioned on the main chassis 1.

An "L" shaped trigger arm 10 is pivoted about a support shaft 10a on the main chassis 1 with its horizontal contact section 10b being movable to or from the rear end of the play lever 2. The trigger arm 10 has at the extreme rear of its vertical segment bearing surfaces 10d and 10e engageable and removable from an arm 19 to be discussed below and at its middle portion a projection 10c. The trigger arm 10 is biased in the direction of the arrow E under the influence of a spring 30 lying between a pin 30a on its vertical segment and a pin 30b on the main chassis 1, with the range of its rotating movement being limited by a pin 10f on the main chassis 1. Upon actuation of the play lever 2 the contact section 10b is depressed and the trigger arm 10 is rotated in the direction of the arrow F against the spring 30 by a given angle.

A subchassis-actuating arm 11 is of an "L" shaped configuration rotatable about a support shaft 11a and having on the bottom surface of an intermediate portion of its horizontal segment traversing the top surface of the vertical segments of the arm 9 and the trigger arm 10 a sliding projection 11b. The rear end of a vertical segment of the actuating arm 11 serves as a contact surface 11c movable with respect to a subchassis 15 to be described below. A spring 26 lying between a pin 26a on the subchassis-actuating arm 11 and a pin 26b on the main chassis 1 urges the arm 11 in the direction of the arrow F. The range of rotation of the arm 11 is limited by a pin 11d extending upwardly from the main chassis 1. As discussed hereafter, it is noted that the spring 26 provides a cam gear 12 with a torque of rotation when the tape recorder is about to change from a play mode to program search mode.

The above mentioned cam gear 12 is pivoted about a support shaft 12a on the main chassis 1 between the vertical segment of the trigger arm 10 and the main chassis 1. The cam gear 12 consists of a geared portion on its periphery and a gear-free portion 12j and the top surface thereof in front of the gear-free portion 12j (that is, the forward end of the cam gear 12 when viewed in the direction of rotation as denoted by the arrow F) bears a first hump 12g which brings a bearing surface 12l into engagement with the bearing surface 9c of the projection 9b on the engaging arm 9. A cam 12b of a circular shaped strip with a gradually varying radius of curvature about the support shaft 12a is mounted on the top surface of the cam gear 12. Formed on the periphery of the cam 12b are an outwardly extending second hump 12e in a position to correspond to the gear-free portion 12j and an upwardly extending third hump 12m in a position opposite the above mentioned position.

A cam inner surface 12c of the cam 12b consists of a maximum diameter portion $12c_3$ intermediate the second and third humps 12e and 12m (the latter being ahead of the former 12e in the rotating direction of the cam gear 12), a minimum diameter portion $12c_1$ slightly ahead of the maximum diameter portion $12c_3$ in the rotating direction of the cam gear 12 and an incline surface portion $12c_2$ intermediate the maximum diameter portion and the minimum diameter portion. With such an arrangement, the sliding projection 11b of the subchassis-actuating arm 11 moves slidingly over the inner surface 12c of the cam 12b. In any mode other than play mode the maximum diameter portion $12c_3$ is seated on the sliding projection 11b and the subchassis-actuating arm 11 is held in contact with the pin 11d under the influence of the spring 26. On the other hand, in play mode (or record mode) the minimum diameter portion $12c_1$ moves slidingly over the projection 11b and the subchassis-actuating arm 11 is rotated in the direction of the arrow E against the spring 26 and forced into its operating position in which a subchassis 15 is moved back to a second position as clarified hereafter.

It is understood that the second hump 12e has bearing surfaces $12f_1$ and $12f_2$ corresponding to the bearing surfaces 9d and 9c of the projection 9b of the arm 9 and the third hump 12m has a bearing surface 12d corresponding to the projection 10c of the trigger arm 10.

A driving gear 13 is pivoted on a support shaft 13a on the main chassis 1 together with a pulley 13b which is driven by a driving motor 14 through a conveyer belt 33 extending between the pulley 13b and a motor shaft 14a. The cam gear 12 is driven by the driving gear 13 being engaged with the gear portion of the cam gear 12. In a stop mode the rear end of the gear-free portion 12j of the gear 12 is faced vis-a-vis to the driving gear 13 due to engagement between the projection 10c of the trigger arm 10 and the third hump 12m.

The subchassis 15 is located behind the above described components and held slidable on the main chassis 1 by fitting a guide shaft 15a extending from the main chassis 1 and a cassette-mounting pin 15d into guide holes 15b and 15e formed therein. While an erase head 17 and a record/play head 18 are fixedly secured on the subchassis, the engaging arm 19 is pivoted at 19a and biased in such a manner as to abut on a pin 15c and come to contact with the trigger arm 10 under the influence of a spring 31 positioned between a pair of pins 31a and 31b.

It is understood that the subchassis 15 is urged toward the direction of the arrow B and constantly held in its first position, the foremost position in a stop mode, by the force of a spring 29 positioned between a pin 29a and an opposite pin 29b on the main chassis 1.

The subchassis is in either of three positions: the above mentioned first position in which the two heads 17 and 18 are spaced away from the tape in a cassette 16 on the cassette-mounting pin 15d; the above mentioned second position (in record mode or play mode) in which the subchassis 15 is moved backwardly by the actuating arm 11 and the two heads 17 and 18 are held completely in contact with the tape; and a third position in which the subchassis is released from the actuating arm 11 in the second position and instead held by the trigger arm 10 via the engaging arm 19 slightly ahead of the second position toward the first position. With the third position, the two heads 17 and 18 are enabled to lightly contact the tape and pick up recordings on the tape at high speed.

The cassette 16 is properly held by means of the cassette-mounting pin 15 not to move forwardly or backwardly and driven in a well known manner by a supply reel and a take-up reel (not shown) via an opening in the subchassis 15.

A start spring 32 is wound about a support shaft 32a extending from the main chassis 1 with its one end engaging with a pin 32b on the main chassis 1 and its remaining end being engageable and removable from the third hump 12m of the gear 12 and giving the cam gear 12 torque of rotation in the direction of the arrow E when engaging with the hump.

When engaging with the third hump 12m, the start spring 32 is compressed and held under an energy-storing state. Should the projection 10c on the trigger arm 10 become disengaged from the third hump 12m of the cam gear 12 and the projection 9b on the arm 9 from the second hump 12e on the cam gear 12, the spring 32 permits the cam gear 12 to rotate in the direction of the arrow E.

It is noted that, after the projection 10c on the trigger arm 10 is disengaged and the cam gear 12 is rotated in the direction of the arrow E, the cam gear 12 comes into mesh with the driving gear 13 and continues further rotating. A pin 32c, when the start spring 32 is disengaged from the third hump 12m, prevents the start spring 32 from expanding too much.

The second lock plate 7 is interlocked with an electromagnetic solenoid although not shown. With the play lever 2 and the fast forward lever 4(or the rewind lever 5) locked in the second position through the action of the first and second lock plates 6 and 7 and the subchassis 15 held in the second position, the tape recorder is forced into the program search mode in which the record/play head 18 searches for a program-to-program silence on the tape and, if any, supplies a signal to the electromagnetic solenoid. As a result, the second lock plate 7 is slid in the direction of the arrow C, thus unlocking the fast forward lever (or the rewind lever) and immediately forcing the tape recorder into a play mode.

The above detailed mode selection assembly operates in the following manner.

(1) Stop Mode

Figure 1:
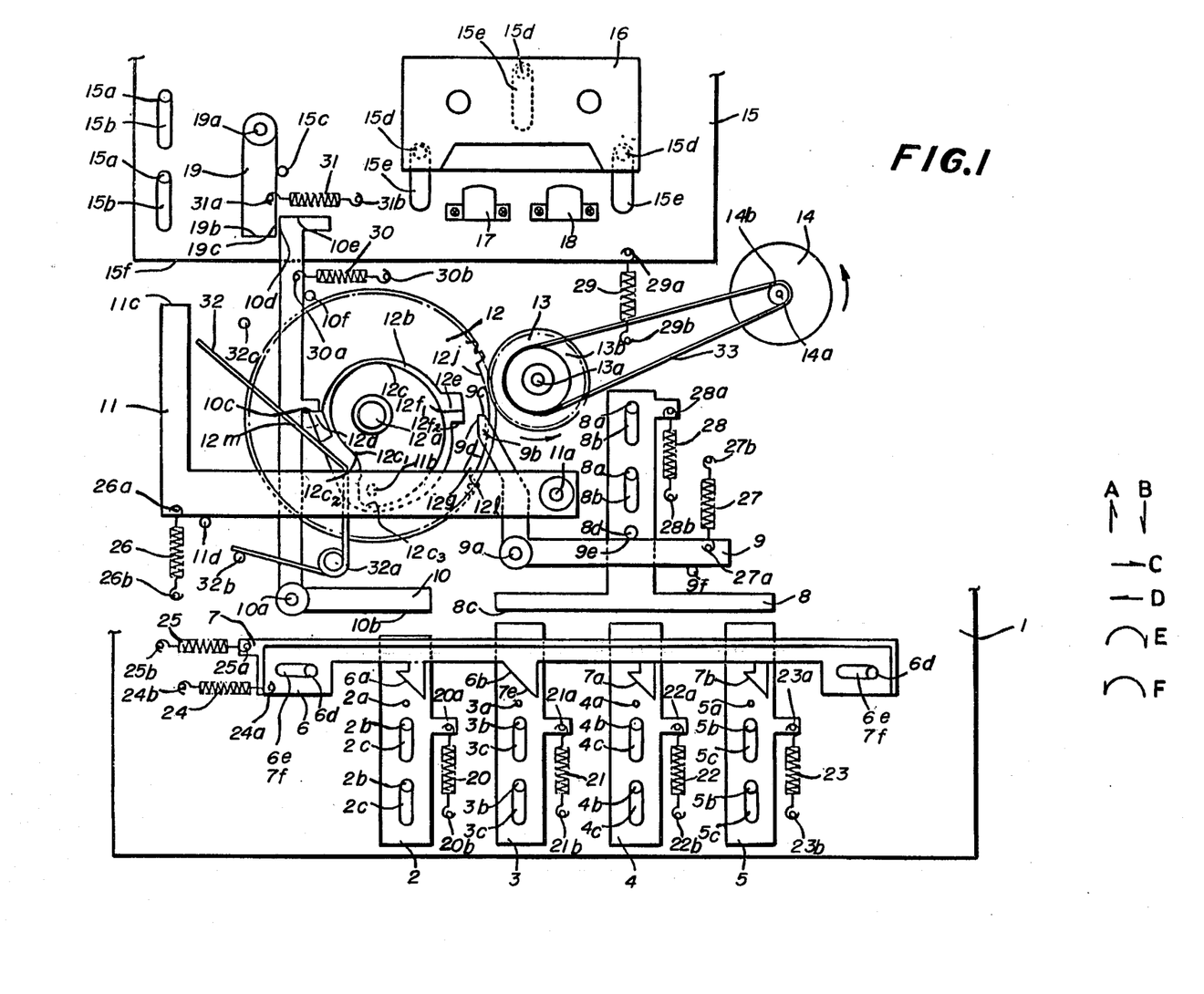
FIG. 1 is a plan view of the mode selection assembly in a stop position.

Referring first to FIG. 1 showing stop mode, the respective actuator levers 2 to 5 are located in the forward or non-actuated positions under the influence of the springs 20 to 23. At this moment the subchassis 15 is in the first position in which the erase head 17 and the record/play head 18 are not in contact with the tape in the cassette 16.

Under the condition where the bearing surface 12d of third hump 12m is in engagement with the projection 10c of the trigger arm 10 in contact with the pin 10f, the cam gear 12 operates such that the rear end of the gear-free portion 12j is in alignment with the driving gear 13 and the maximum diameter portion 12c3 on the inner surface 12c1 is in alignment with the sliding projection 12b of the subchassis-actuating arm 11.

Because of the fact that the maximum diameter portion 12c3 of the cam inner surface 12c is in alignment with the sliding projection 11b, the subchassis-actuating arm 11 is drawn by the spring 26 and brought into contact with the pin 11d with its bearing surface 11c spaced from the subchassis 15 (this position is called "first position of the subchassis-actuating arm" hereafter).

Furthermore, the actuator rod 8 is in the foremost position under the influence of the spring 28 and the arm 9 is in engagement with the pin 9f (this is called "first position of the arm" hereafter) and ready to engage with the first and second humps 12g and 12e of the cam gear 12.

(2) Mode Change from Stop Mode to Play Mode

Mode selection from stop mode to play mode will now be described by reference to FIGS. 1 and 2. Having been actuated in the direction of the arrow A against the spring 20 in the stop mode, the play lever 2 is locked due to engagement between its lock pin 2a and the lock section 6a of the first lock plate 6 and maintained in the actuated position. Upon the sliding movement of the play lever 2 in the direction of the arrow A the bearing section 10b of the trigger arm 10 is depressed by the play lever 2 and rotated in the direction of the arrow F against the spring 30.

Thereafter, with rotation of the trigger arm 10, the projection 10c is disengaged from the third hump 12m and the cam gear 12 is promptly rotated in the direction of the arrow E by the force of the start spring 32 under the energy-storing state and brought into meshing relationship with the driving gear 13 driven by the driving motor 14. Consequently, the cam gear 12 continues rotating in the same direction.

Since the diameter of the inner surface 12c in contact with the sliding projection 11b gradually decreases with rotation of the cam gear 12, the subchassis-actuating arm 11 rotates in the direction of the arrow E against the spring 26, thus moving the subchassis 15 gradually backwardly of the first position via the bearing surface 11c.

Once the cam gear 12 has made substantially a complete revolution and the forward end of the gear-free section 12j has moved in alignment with the driving gear 13, the cam gear 12 is no longer driven by the driving gear 13 immediately before the first hump 12g comes into engagement with the projection 9b of the arm 9. Under these circumstances the sliding projection 11b comes into contact with the minimum diameter portion 12c1 in the inner surface 12c and then reaches the inclined surface portion 12c2 so that the cam gear 12 is given torque of rotation in the direction of the arrow E by the spring 26 and continues rotating for a while. Once the bearing surface 12l of the first hump 12g has engaged with the projection 9b of the arm 9 in its first position, the cam gear 12 is prevented from rotating any more.

The subchassis-actuating arm 11 shifts the subchassis 15 to the backmost or second position and holds the same at this position so that the erase and record/play heads 17 and 18 are in contact with the tape in the cassette 16 (the position of the subchassis-actuating arm 11 is called "second position" hereafter). Under these circumstances the tape is driven at fixed speed by use of a constant speed driving mechanism (including the two reels) which is interlocked with locking the play lever 2 into its actuated position. The bearing surface 10e of the trigger arm 10 is properly spaced from the bearing surface 19b of the arm 19 (this position is called "second position of the trigger arm 10" hereafter). When the trigger arm 10 is depressed by the play lever 2 and rotated in the direction of the arrow F until this condition is reached, the bearing surface 10d comes into contact with the surface 19c of the arm 19 but the arm 19 rotates and escapes in the direction of the arrow E against the spring 31 and shifts from its first to second position by the operation of the subchassis-actuating arm 11. The trigger arm 10 does not move into the above mentioned condition with great difficulty.

(3) Mode Change from Play Mode to Stop Mode

Figure 2:
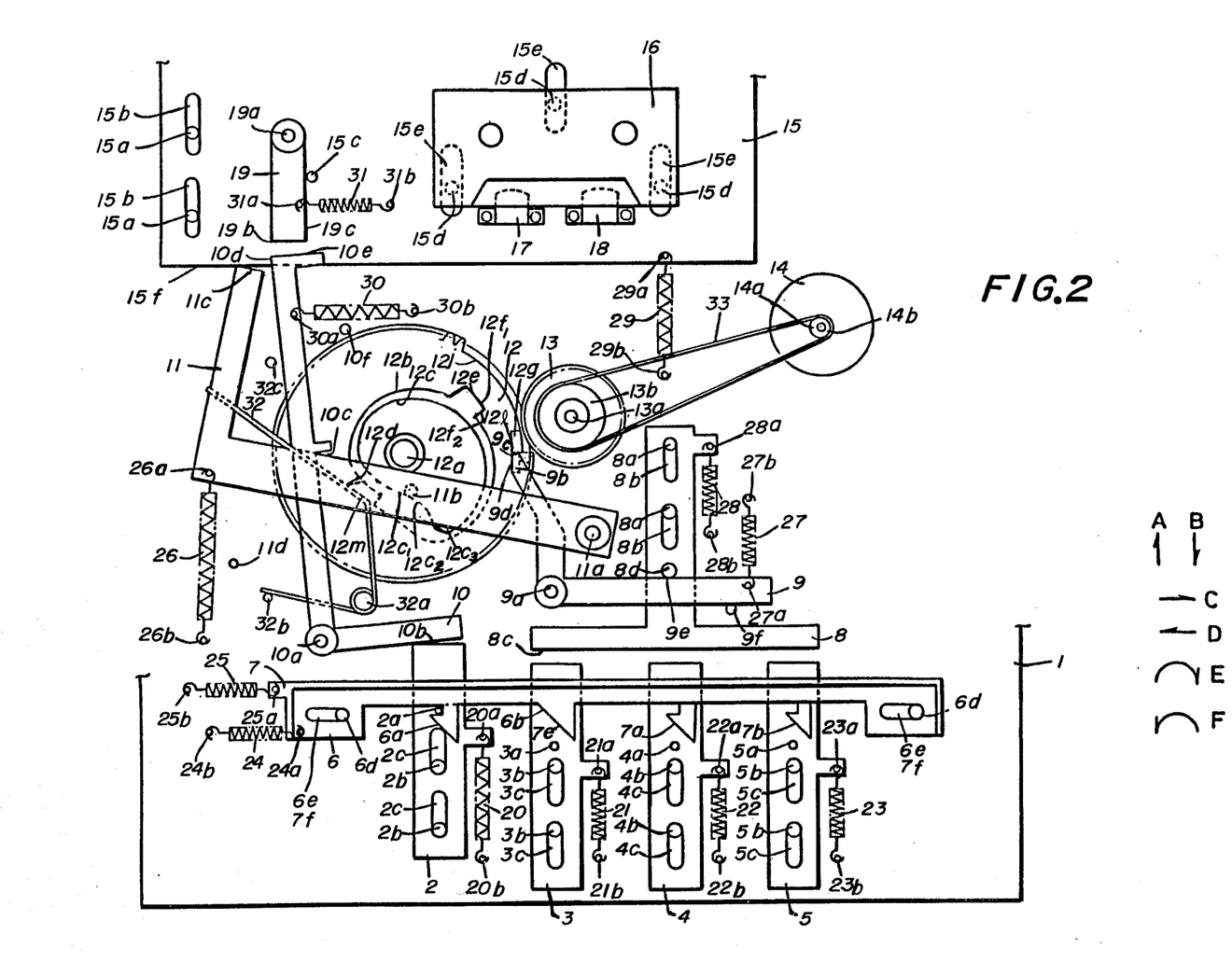
FIG. 2 is a plan view of the same in a play position.

Provided that the stop lever 3 is actuated against the spring 21 as denoted by the arrow A in play mode as seen from FIG. 2, the release pin 3a of the lever 3 abuts on the inclined surfaces 6b and 7e of the first and second lock plates 6 and 7 so that the two lock plates 6 and 7 are shifted in the direction of the arrow C against the springs 24 and 26 to unlock the play lever 2 from the lock section 6a. As a consequence of such unlocking the lever 2 is returned to its non-actuated position by the spring 20 and the trigger arm 10 is drawn in the direction of the arrow E toward the first position by the spring 30. The projection 10c is ready to engage with the third hump 12m.

Since upon actuation of the stop lever 3 the actuator rod 8 is moved in the direction of the arrow A against the spring 28, the arm 9 rotates in the direction of the arrow F in response to the force of the spring 27, thus disengaging the projection 9b from the first hump 12g and making the same ready to engage with the bearing surface $12f_2$ of the second hump 12e (this position is called "third position of the arm" hereafter). Because of the inclined surface $12c_2$ of the inner surface 12c of the cam gear 12 in contact with the sliding projection 11, the force of the spring 26 acts on the cam gear 12 via the sliding projection 11b and the subchassis-actuating arm 11 to rotate the same in the direction of the arrow F (of course, the force of the start spring 32 is relatively small at this time). Once the second hump 12e has been in engagement with the projection 9b of the engaging arm 9 the cam gear 12 comes to a stop.

Since under these circumstances the sliding projection 11b is in alignment with the maximum diameter portion $12c_3$ in the cam inner surface 12c, the spring force of the spring 26 brings the subchassis-actuating arm 11 to its first position and the spring 29 brings the subchassis 15 into its first position wherein the tape is spaced from the two heads 17 and 18.

The foregoing is envisaged when the stop lever 3 is depressed (see FIG. 5). Then, provided that the stop lever 3 is released, it is returned to its non-actuated position under the influence of the spring 21, while the engaging arm 9 is returned to its first position under the influence of the spring 28 together with the actuator rod 8.

Upon the returning movement of the engaging arm 9 the hump 9b is disengaged from the second hump 12e. Since the cam gear 12 has already been given torque of rotation in the direction of the arrow E via the third hump 12m by the start spring 32 at this moment, the cam gear 12 is rotated in the direction of the arrow E under the influence of the start spring 32 and discontinued from rotating when the third hump 12m comes into contact with the projection 10c of the trigger arm already returned to its first position. In this manner, the respective components are returned to stop mode as shown in FIG. 1. It is obvious that the constant speed driving mechanism is disabled when the play lever 2 is returned to its non-actuated position.

(4) Mode Change from Stop Mode to Fast Forward (FF) Mode

Mode change from stop mode to fast forward mode will be clear from a review of FIGS. 1 and 3. When the fast forward lever 4 is depressed in the direction of the arrow A against the spring 22 under stop mode, it is locked at the lock section 7a of the second lock plate 7 via the lock pin 4a and held at this actuated position.

Upon depression of the fast forward lever 4 in the direction of the arrow A the actuator rod 8 slides in the direction of the arrow A against the spring 28 so that the arm 9 is rotated from the first position along the arrow F by the action of the spring 27 and then stopped with the bearing surface 9d of its projection 9b in contact with the surface $12f_1$ of the second hump 12e (this position is the second position of the engaging arm 9 between the first and third positions). Even after the arm 9 has come to a stop, the actuator rod 8 continues moving backwardly as the fast forward lever 4 slides. The actuator rod stops moving when being locked with the second lock plate 7.

The foregoing places the tape recorder into fast forward mode in which the tape in the cassette 16 runs from the supply reel to the take-up reel at high speed by means of a high speed driving mechanism (not shown, but including two reel supports) which is enabled when the actuator lever 4 is locked in its actuated position by the second lock plate 7.

Mode change from stop mode to rewind mode is achieved in a likewise manner as mentioned above except that the rewind lever 5 is locked with the lock section 7b of the second lock plate 7 and the tape in the cassette travels from the take-up reel to the supply reel by the operation of the high speed driving mechanism.

(5) Mode Change from Fast Forward Mode to Stop Mode

Provided that the stop lever 3 is actuated in the direction of the arrow A against the spring 21 in the above mentioned fast forward mode, the release pin 3a of the lever 3 abuts on the inclined surfaces 6b and 7e of the first and second lock plates 6 and 7 to thereby push the two lock plates 6 and 7 in the direction of the arrow C against the springs 24 and 25 and to unlock the fast forward lever 4 from the lock section 7a.

Upon unlocking the fast forward lever 4 and releasing the stop lever 4 from the depressed position the spring 22 places the lever 4 back to its non-actuated position and the spring 28 places the engaging arm 9 back to the first position or stop mode as well as the actuator rod 8. Of course, the high speed mechanism is disabled whereupon the tape discontinues running.

It is understood that mode change from rewind mode to stop mode is performed in the same manner as described above except that actuation of the stop lever 3 unlocks the rewind lever 5 from the second lock plate 7.

(6) Program Search Mode

Program search mode is set up either under stop mode by simultaneously actuating the play lever 2 and the fast forward lever 4 (or the rewind lever 5) or under play mode by actuating the fast forward lever 4 (or the rewind lever 5). The former is called "first mode" and the latter is called "second mode" hereafter.

In either case, program search mode set up by actuation of the rewind lever 5 is different only in the direction of tape travel from that by the fast forward lever 4. Therefore, the following will set forth the program search mode set up by the fast forward lever 4 (see FIG. 4).

(a) First Mode

When the play lever 2 and the fast forward lever 4 are simultaneously depressed in the direction of the arrow A in stop mode of FIG. 1, these levers 6 and 7 are locked into its actuated position with the lock sections 6a and 7a of the first and second lock plates 6 and 7.

As the play lever 2 slides in the direction of the arrow A the trigger arm 10 rotates in the direction of the arrow F while rotating the arm 19 in the direction of the arrow E against the spring 30. Immediately after this rotation the projection 10c is disengaged from the hump 12m so that the cam gear 12 starts rotating in the direction of the arrow E against the start spring 32 and continues rotating under the influence of the driving gear 13.

On the other hand, as the fast forward lever 4 slides in the direction of the arrow A, the arm 9 rotates in the direction of the arrow F under the influence of the spring 27. Meanwhile, the bearing surface 9d abuts on the bearing surface $12f_1$ of the second hump 12e and discontinues rotating in the direction of the arrow F for a brief period of time. However, since the cam gear 12 further rotates, the bearing surface 9d is disengaged from the opposing surface $12f_1$ and the arm 9 starts again rotating in the direction of the arrow F and reaches the third position engageable with the bearing surface $12f_2$ of the second hump 12e. Consequently, the arm comes to a stop and is ready to engage with the bearing surface $12f_2$.

As experienced for mode change from stop mode to play mode, the subchassis-actuating arm 11 rotates in the direction of the arrow E as the cam gear 12 rotates and the sliding projection 11b slides. If the subchassis 15 is moved from the first back to the second position, then the subchassis 15 is brought into the second position as soon as the sliding projection 11b moves from the minimum diameter portion $12c_1$ of the cam inner surface 12c to the inclined surface portion $12c_2$. Unlike in the above discussed play mode the engaging arm 9 stands in the third position where the projection 9b is not in contact with the first projection 12g and the cam gear 12 further rotates under the force of the spring 26 via the sliding projection 11b. As the sliding projection 11b moves from the maximum diameter portion $12c_3$ down to the inclined surface portion $12c_2$, the subchassis-actuating arm 11 starts reversing in the direction of the arrow F. Thereafter, if the bearing surface $12f_2$ of the second hump 12e comes into contact with the bearing surface 9c of the projection 9b on the arm 9 after making substantially a complete revolution, the cam gear 12 discontinues rotating.

As soon as the subchassis-actuating arm 11 rotates in the reverse direction the subchassis 15 advances from the second position toward the first position. Meanwhile, the bearing surface 10e of the trigger arm 10 in the second position is touched via the arm 19 upon actuation of the play lever 2 and held in the second position although the subchassis-actuating arm 11 further rotates in the reverse direction. When the sliding projection 11b is in alignment with the maximum diameter portion $12c_3$ of the cam inner surface, the subchassis-actuating arm 11 stands in the first position. The start spring 32 is compressed and placed into energy-storing condition by the third hump 12m.

The foregoing procedure places the tape recorder from stop mode to fast forward mode whereupon the erase and record/play heads 17 and 18 lightly touch the tape and the tape runs at high speed by means of the high speed driving mechanism with the fast forward lever 4 in its actuated position. A program search circuit (not shown) senses a program-to-program silence via the record/play head 18.

(b) Second Mode

Have been actuated in the direction of the arrow A in play mode of FIG. 2, the fast forward lever 4 is locked with the lock section 7a of the second lock plate 7, rotating the arm 9 in the direction of the arrow F with the aid of the spring 27. The arm 9 disengages the first hump 12g and moves from the second to the third position where it is to wait when the bearing surface $12f_2$ of the second hump 12e abuts on the bearing surface 9c.

Thereafter, upon disengaging the first hump 12g of the arm 9 the cam gear 12 being supplied with the force of the spring 26 via the inclined surface portion $12c_2$ of the cam inner surface 12c promptly starts rotating in the direction of the arrow E and the subchassis-actuating arm 11 holding the subchassis 15 in its second position starts reversing in the direction of the arrow F while the sliding projection 11b moves from the inclined surface portion $12c_2$ down to the maximum diameter portion $12c_3$.

Shortly after the subchassis-actuating arm 11 has started reversing, the bearing surface $12f_2$ of the second hump 12e comes into contact with the surface 9c of the hump 9b on the arm 9 and the cam gear 12 discontinues rotating.

As the subchassis-actuating arm 11 reverses, the subchassis 15 proceeds from the second position toward the first position and comes into engagement with the bearing surface 10e of the trigger arm 10 in the second position via the arm 19 upon actuation of the play lever 2. Even though the subchassis-actuating arm 11 is further reversing, the subchassis 15 is stopped in the second position. The subchassis-actuating lever 11 stops in the first position as soon as the sliding projection 11b reaches the maximum diameter portion $12c_3$ of the cam inner surface. Under these circumstances, the start spring 32 is compressed and held in energy-storing state by the third hump 12m.

The foregoing procedure places the tape recorder from play mode into fast forward/program search mode where the erase and record/play heads 17 and 18 are in light contact with the tape and the tape runs at high speed while being driven by the high speed driving mechanism with the fast forward lever 4 in its actuated position. The program seacher senses a silence by way of the head 18.

(7) Mode Change from Program Search Mode to Play Mode

When finding any program-to-program silence on the tape through the record/play head 18 in program search mode as in FIG. 4, the solenoid is immediately supply with the enabling signal to shift the second lock plate 7 in the direction of the arrow C.

Then, the fast forward lever 4 is unlocked upon the sliding movement of the second lock plate 7 and returned to the non-actuated position by the spring 22. The arm 9 returns from the third to the first position by the force of the spring 28, thus disengaging the second hump 12e.

Upon disengagement of the second hump 12e the cam gear 12 is rotated in the direction of the arrow E by the force of the start spring 32 under energy-storing state and immediately meshes into the driving gear 13 to further rotate.

While the cam gear 12 is rotating, the subchassis-actuating arm 11 previously in the first position in search mode rotates in the direction of the arrow E and the subchassis 15 again moves backwardly of the second position as the sliding projection 11b approaches the minimum diameter portion $12c_1$. The cam gear 12 discontinues rotating if the cam gear 12 makes a complete turn and the foremost end of the gear-free portion $12j$ is in alignment with the driving gear 13 and the first hump $12g$ into alignment with the projection $9b$ of the arm 9. At this time the cam gear 12 supports the sliding projection $11b$ by the inclined surface portion $12c_3$ and the subchassis-actuating arm 11 returns to the second position and the subchassis 15 also returns to the second position. Therefore, the tape record is placed from program search mode to play mode as shown in FIG. 2.

(8) Mode Change from Program Search Mode to Stop Mode

When the stop lever 3 is actuated in the direction of the arrow A to shift the two lock plates 6 and 7 in the direction of the arrow C against the springs 24 and 26 in fast forward/program search mode, the two levers 2 and 4 are unlocked and returned to the non-actuated position by the force of the springs 20 and 22.

As the play lever 2 is advanced, the trigger arm 10 is returned to the first position by the spring 30 and is disengaged from the arm 19. As a result of this, the subchassis 15 returns from the third to the first position under the force of the spring 29. On the other hand, the actuator rod 8 is returned by the force of the spring 28 so that the arm 9 returns from the third to the first position. The projection $9b$ is therefore disengated from the second hump $12e$ and the start spring 32 allows the cam gear 12 to rotate and the projection $10c$ on the trigger arm 10 engages with the third hump $12m$, thus interrupting rotation of the cam gear 12.

In this manner, the tape recorder is placed into stop mode. Upon release the stop lever 3 is returned to the non-actuated position and the first and second lock plates 6 and 7 are returned to its home position via the springs 24 and 25.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A power assisted mode selection assembly for a recording and playback tape machine comprising:
   a main chassis;
   a plurality of levers, individually, operatively, movably mounted on said main chassis;
   a subchassis movably mounted on said main chassis;
   actuating means being movably mounted on said main chassis for selectively imparting movement to said subchassis;
   rotating means being intermittently driven for selectively imparting movement to said actuating means;
   a cam surface including a plurality of humps being operatively affixed to said rotating means;
   engaging means being operatively connected for selective movement to a predetermined number of said plurality of levers for selectively engaging one of said plurality of humps on said cam surface to stop the rotation of said rotating means;
   wherein each of said plurality of levers may be manually, individually actuated to select one of a plurality of predetermined operating modes of said tape machine and said rotating means providing a power assist to impart movement to said actuating means and said subchassis, and said engaging means being selectively actuated to engage one of said plurality of humps on said cam surface to stop the rotation of said rotating means to maintain said subchassis in a predetermined operating mode and being selectively movable out of engagement with one of said plurality of humps to permit rotation of said rotating means for selection of another predetermined operating mode.

2. A power assisted mode selection assembly according to claim 1, wherein said plurality of levers include stop, play, fast forward and fast forward/program search levers.

3. A power assisted mode selection assembly according to claim 1, wherein said actuating means include a sliding projection operatively engaged with said cam surface for selectively imparting movement to said actuating means and said subchassis upon rotation of said rotating means.

4. A power assisted mode selection assembly according to claim 1, and further including a trigger arm operatively positioned adjacent to one of said plurality of levers, said trigger arm including a projection selectively engageable with one of said plurality of humps on said cam surface for stopping the rotation of said rotating means.

5. A power assisted mode selection assembly according to claim 4, wherein said one of said plurality of levers is a play lever being movable to an operative position for disengaging said projection on said trigger arm from said hump on said cam surface to permit rotation of said rotating means and movement of said actuating means to impart movement of said subchassis.

6. A power assisted mode selection assembly according to claim 1, wherein said subchassis further includes a head means for selectively erasing or recording/playing a tape upon movement of said subchassis to a predetermined position.

7. A power assisted mode selection assembly according to claim 1, wherein said rotating means includes a cam gear, a driving gear and a driving motor, said driving gear being operatively driven by said driving motor for selectively imparting rotation to said cam gear when said plurality of humps are disengaged from said engaging means.

8. A power assisted mode selection assembly according to claim 1, wherein said engaging means is operatively positioned for engagement with a stop lever, a fast forward lever and a fast forward/program search lever.

9. A power assisted mode selection assembly according to claim 1, and further including a start spring for initially imparting rotation to said rotating means upon actuation of a predetermined one of said plurality of levers.

10. A power assisted mode selection assembly according to claim 9, wherein said predetermined one of said plurality of levers is a play lever.

11. A power assisted mode selection assembly according to claim 2, wherein said stop, fast forward and fast forward/program levers are operatively positioned to impart movement to said engaging means.

12. A power assisted mode selection assembly according to claim 11, wherein upon actuation of said play lever said subchassis is maintained in a displaced operative position.

13. A power assisted mode selection assembly according to claim 11, wherein upon actuation of said stop lever said subchassis is returned to an inoperative position.

14. A power assisted mode selection assembly according to claim 11, wherein upon actuation of said play lever and said fast forward lever said subchassis is maintained in a displaced operative position.

15. A power assisted mode selection assembly according to claim 1, and further including first and second lock plates operatively engageable by said plurality of levers.

* * * * *